(12) United States Patent
Lin et al.

(10) Patent No.: US 12,085,047 B2
(45) Date of Patent: Sep. 10, 2024

(54) AIR INTAKE DEVICE

(71) Applicant: GUANGZHOU AUTOMOBILE GROUP CO., LTD., Guangdong (CN)

(72) Inventors: Sicong Lin, Guangdong (CN); Wenfeng Zhan, Guangdong (CN); Yuhuai Li, Guangdong (CN); Bo Li, Guangdong (CN); Hao Feng, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 18/000,227

(22) PCT Filed: Aug. 1, 2022

(86) PCT No.: PCT/CN2022/109463
§ 371 (c)(1),
(2) Date: Nov. 29, 2022

(87) PCT Pub. No.: WO2023/093114
PCT Pub. Date: Jun. 1, 2023

(65) Prior Publication Data
US 2023/0349346 A1 Nov. 2, 2023

(30) Foreign Application Priority Data
Nov. 26, 2021 (CN) .......................... 202111419070.7

(51) Int. Cl.
*F02M 35/10* (2006.01)
*F02B 29/04* (2006.01)
*F02M 35/104* (2006.01)

(52) U.S. Cl.
CPC ... *F02M 35/10157* (2013.01); *F02B 29/0437* (2013.01); *F02M 35/10255* (2013.01); *F02M 35/104* (2013.01)

(58) Field of Classification Search
CPC ....... F02M 35/10157; F02M 35/10255; F02M 35/104; F02M 35/116; F02M 35/10288;
(Continued)

(56) References Cited

U.S. PATENT DOCUMENTS 7,287,493 B2 * 10/2007 Buck ..................... F02F 7/0031
123/41.74
7,344,424 B2 * 3/2008 Ozaki ..................... B63B 34/10
440/88 A (Continued)

FOREIGN PATENT DOCUMENTS

CN 203499808 3/2014
CN 103726959 4/2014
(Continued)

OTHER PUBLICATIONS

Machine Translation CN 203499808 (Year: 2023).*

*Primary Examiner* — Dapinder Singh
(74) *Attorney, Agent, or Firm* — Hodgson Russ LLP

(57) ABSTRACT

An air intake device includes a supercharger, a connection tube, an intercooler, and an intake manifold. The supercharger is connected to an exhaust port of a cylinder. The intercooler is connected to the supercharger through the connection tube. The intake manifold is connected to the intercooler and an intake port of the cylinder. The intercooler is located above a cylinder head of an engine. The device of the present disclosure features less height space occupation, a short connection tubeline between elements and a compact structure, which is beneficial for an increase of the pressurization response speed and reduction in the cost.

10 Claims, 5 Drawing Sheets

(58) Field of Classification Search
CPC ........ F02M 26/28; F02M 26/29; F02M 26/30;
F02M 26/31; F02M 26/32; F02M 31/20;
F02B 29/0437; F02B 29/0475; F02B
29/0456; F02B 29/045; F02B 29/0462;
F02B 29/0418; F02B 29/0425; F02B
29/0431; F02B 29/04; F02B 29/0406;
Y01P 2060/02
See application file for complete search history.

(56) References Cited

U.S. PATENT DOCUMENTS

| | | | | |
|---|---|---|---|---|
| 10,180,102 | B2* | 1/2019 | Kondo | .................... F02B 37/00 |
| 2014/0102423 | A1* | 4/2014 | Owen | ................ F02M 35/1047 |
| | | | | 123/542 |

FOREIGN PATENT DOCUMENTS

| | | |
|---|---|---|
| CN | 106150793 | 11/2016 |
| CN | 216588829 | 5/2022 |
| EP | 1063413 | 12/2000 |
| JP | H10103064 | 4/1998 |
| JP | 2001303961 | 10/2001 |
| WO | 2022009840 | 1/2022 |

* cited by examiner

US 12,085,047 B2

AIR INTAKE DEVICE

CROSS-REFERENCE TO RELATED APPLICATIONS

The present application is a U.S. national stage entry of International Application No. PCT/CN2022/109463, filed Aug. 1, 2022, which claims the priority to Chinese Patent Application No. 202111419070.7, filed Nov. 26, 2021, the entire disclosures of which are incorporated herein by reference.

FIELD OF TECHNOLOGY

The disclosure relates to the field of automobiles, in particular to an air intake device of an engine.

BACKGROUND

In order to improve the performance of reciprocating internal combustion engines, turbocharger technology is adopted, which makes it difficult to arrange the cabin space.

SUMMARY

In view of this, the embodiments of the present disclosure provide an air intake device which has a compact structure.

According to an aspect of the embodiments of the present disclosure, there is provided an air intake device including: a supercharger connected to an exhaust port of a cylinder; a connection tube; an intercooler connected to the supercharger through the connection tube, and an intake manifold connected to the intercooler and an intake port of the cylinder, wherein the intercooler is located above a cylinder head of an engine.

REFERENCE SIGNS supercharger—10, exhaust gas inlet—11, air inlet—13, air outlet—14, exhaust gas inlet pipe—15, connection tube—20, intercooler—30, gas passage inlet—31$a$, gas passage outlet—31$b$, cooling passage—32, intake manifold—40, pressure stabilizing chamber—41, intake passage—42, throttle valve—50; and cylinder head—60.

DETAILED DESCRIPTION OF THE EMBODIMENTS

Specific embodiments of the present disclosure are described in further detail below with reference to the accompanying drawings and embodiments. The following embodiments are used to illustrate the present disclosure, but are not intended to limit the scope of the present disclosure.

Figure 1:
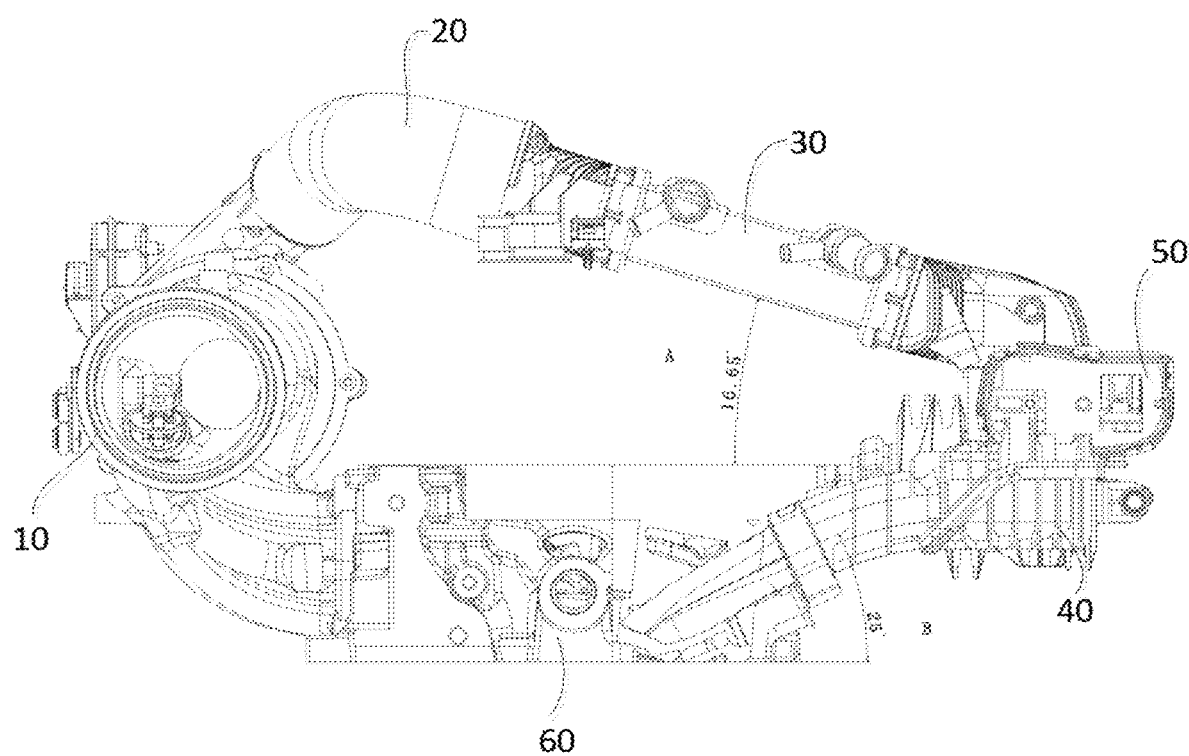
FIG. 1 is a schematic view of an air intake device provided in the present disclosure.

As shown in FIG. 1, the air intake device of the present disclosure includes a supercharger 10, a connection tube 20 connected to the supercharger 10, an intercooler 30 connected to the connection tube 20, an intake manifold 40 connected to the intercooler 30, and a throttle valve 50 positioned between the intercooler 30 and the intake manifold 40.

Figure 2:
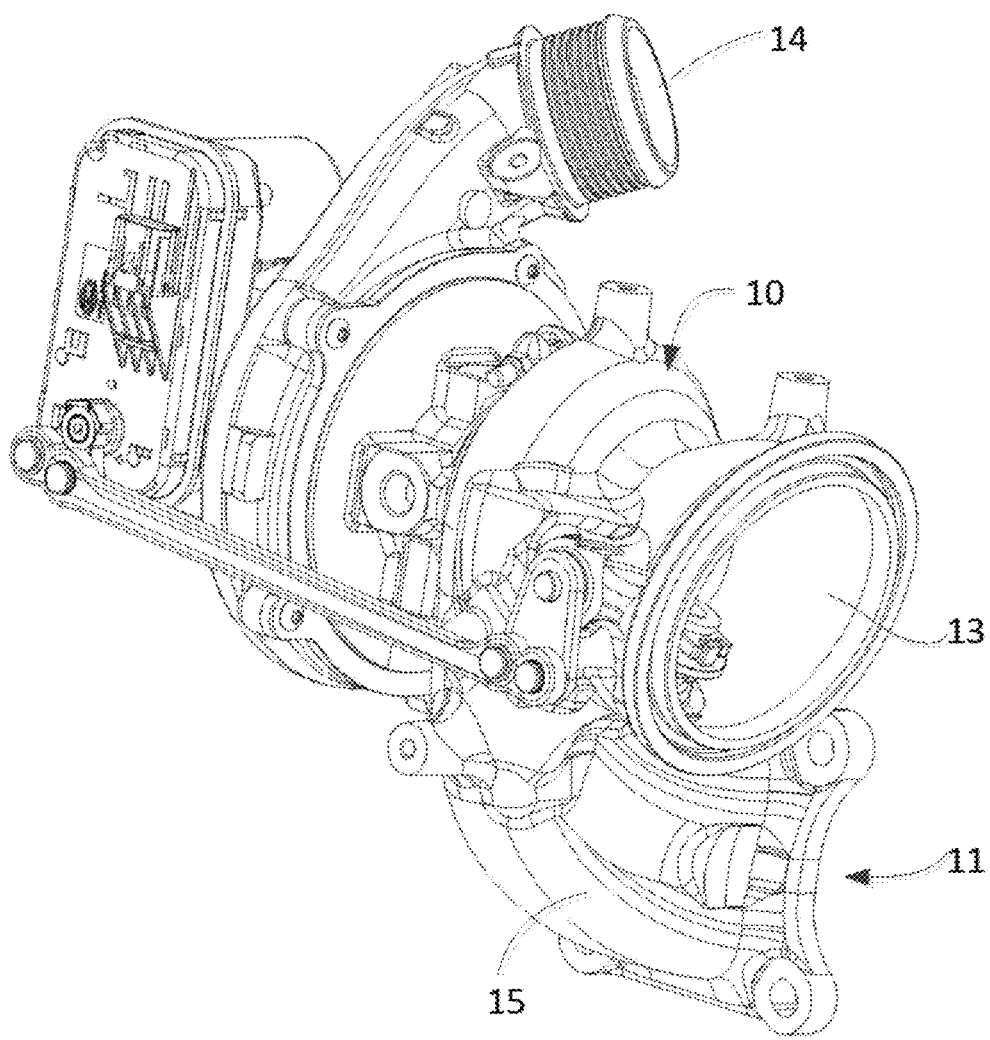
FIG. 2 is a schematic view of a turbocharger in FIG. 1.

Referring to FIG. 2, the supercharger 10 in this embodiment is a turbocharger, which is arranged at an upper left side of the cylinder head 60 of the engine and connected to an exhaust port of the cylinder. More specifically, the supercharger 10 of the present disclosure includes an exhaust gas inlet 11, an exhaust gas outlet (not shown), an air inlet 13, and an air outlet 14. The exhaust gas inlet 11 is connected to an exhaust port of the cylinder, the exhaust gas outlet is connected to an exhaust pipe of an automobile, the air inlet 13 is connected to an air filter, and the air outlet 14 is connected to the connection tube 20. The exhaust gas discharged from the engine enters the supercharger 10 through the exhaust gas inlet 11, impacts the turbine to run at a high speed, drives the coaxial compressor to rotate at a high speed, sucks the fresh air filtered by the air filter into the compressor for compression and pressurization, and then pressurizes the pressurized air to the connection tube 20 through the air outlet 14. In the present disclosure, a height of the exhaust gas inlet pipe 15 between the exhaust gas inlet 11 and the turbine is greater than a height of the exhaust gas inlet 11. That is, the exhaust gas inlet pipe 15 is folded upwards with respect to the exhaust gas inlet 11 so that the air outlet 14 of the supercharger 10 is closer to the intercooler 30, a length of the connection tube 20 between the supercharger 10 and the intercooler 30 is shortened, and the structure of the whole device is more compact. In other embodiments of the present disclosure, the supercharger 10 may also be of a down-turning structure, i.e., the exhaust gas inlet pipe 15 is folded downward relative to the exhaust gas inlet 11. Compared with the upturning structure of the supercharger 10, a height difference between the supercharger 10 and the intercooler 30 is slightly larger, so the length of the corresponding connection tube 20 is slightly longer, but the structure of the whole device is still relatively compact.

The shape of the connection tube 20 depends on the relative position between the air outlet 14 of the supercharger 10 and the gas passage inlet 31$a$ of the intercooler 30. In the embodiment shown in FIG. 1, a position of the air outlet 14 of the supercharger 10 is lower than that of the gas passage inlet 31$a$ of the intercooler 30, and the air outlet 14 of the supercharger 10 is located on the left side of the gas passage inlet 31$a$ of the intercooler 30, and the corresponding connection tube 20 is of a V-shaped structure that first extends from the bottom upward at an angle, and then extends from the top downward at an angle, i.e., the connection tube 20 is a V-shaped structure with the apex pointing upward. In the embodiment in which the supercharger 10 is of the down-turning structure, the shape of the connection tube 20 is similar to that in the case where the supercharger 10 is of the upturning structure, but due to the increase of the height difference between the air outlet 14 of the supercharger and the gas passage inlet 31$a$ of the intercooler 30, the length of the connection tube 20 in the case where the supercharger 10 is of the down-turning structure is larger than the length of the connection tube 20 in the case where the supercharger 10 is of the upturning structure. In other embodiments of the present disclosure, it is also possible that a position of the air outlet 14 of the supercharger 10 is higher than a position of the gas passage inlet 31a of the intercooler 30, the corresponding connection tube 20 may be of a linear structure.

The intercooler 30 of this embodiment is a water-cooled intercooler which is located above the cylinder head 60 and is connected to the supercharger 10 through the connection tube 20. Gas passages (not shown) and cooling passages 32 are provided inside the intercooler 30. The main parts of the gas passages and the cooling passages 32 in this embodiment are both linear passages, and the cooling passages 32 are adjacent to the gas passages so as to cool the gas in the gas passages through the cooling fluid. In this embodiment, the intercooler 30 is inclined downward relative to the horizontal direction by a certain angle. The angle may range from 13.65° to 19.65°, so that a height of the gas passage inlet 31a is higher than a height of the gas passage outlet 31b, so that there is no low-lying part in the gas passage, and water vapor condensed by cooling in the gas passage can flow to the throttle valve 50 along the inner wall surface of the gas passage, thereby avoiding accumulation in the intercooler 30.

Figure 3:
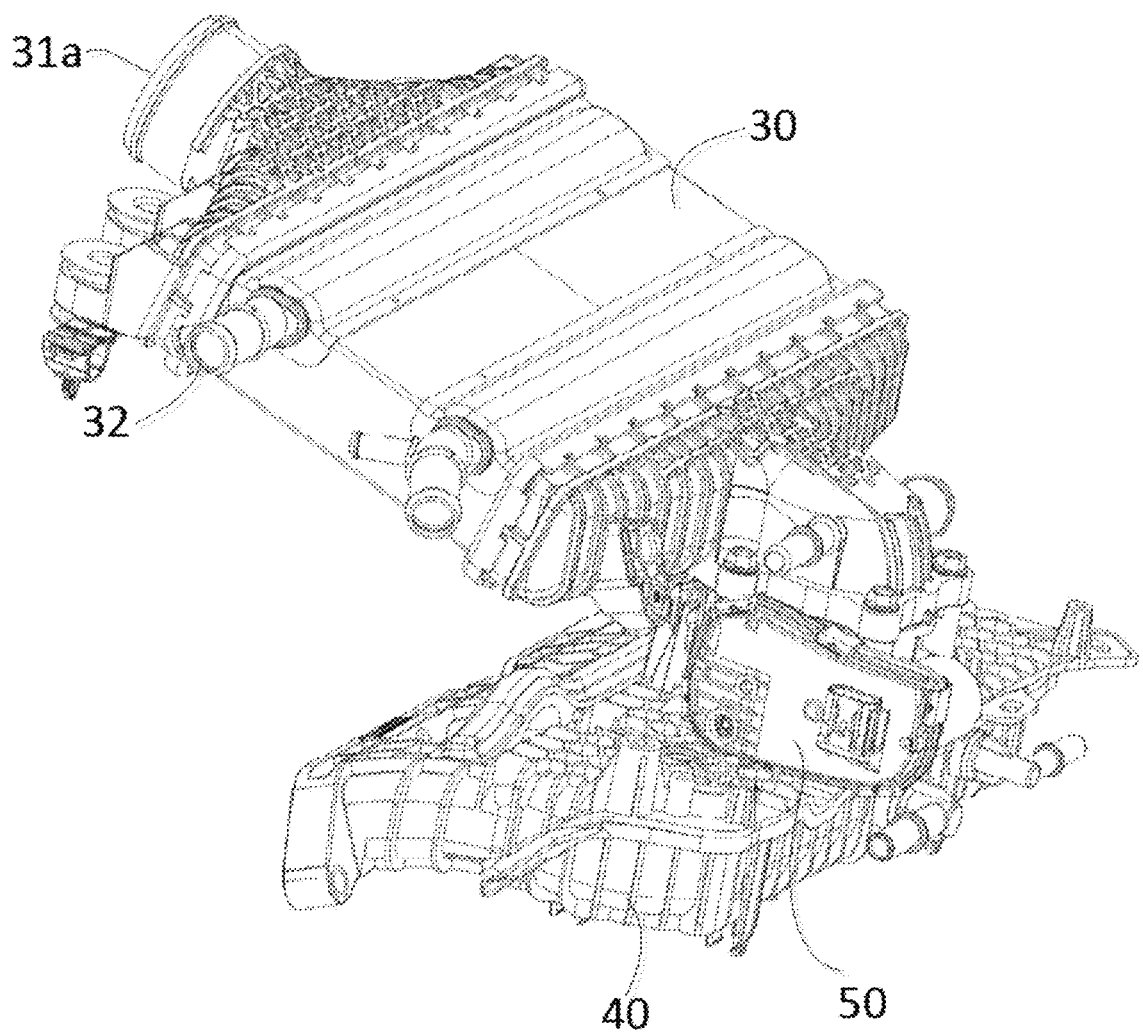
FIG. 3 is a schematic assembly view of an intercooler, a throttle valve and an intake manifold in FIG. 1.
Figure 4:
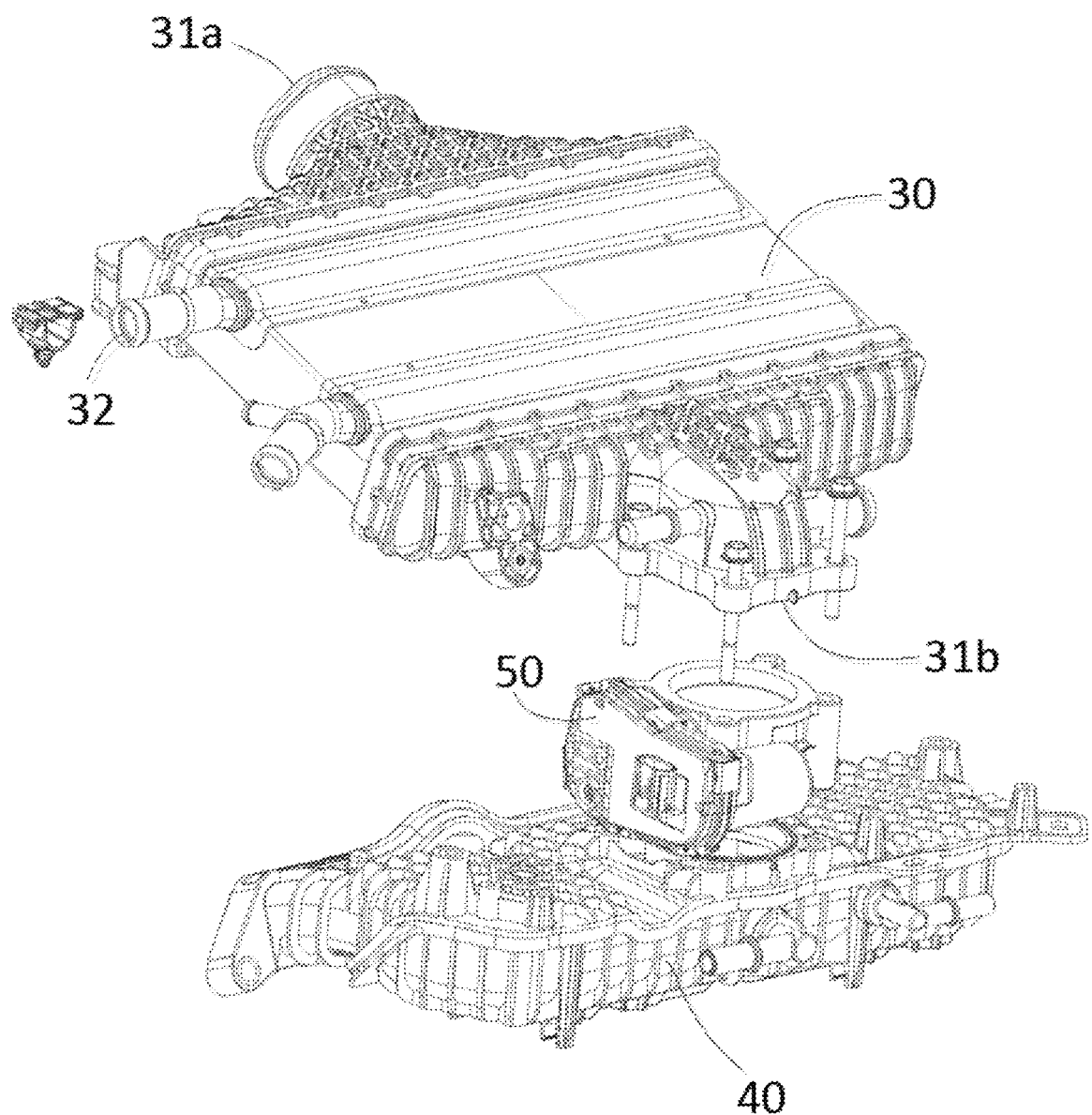
FIG. 4 is an exploded schematic view of FIG. 3.

Referring to FIGS. 3 and 4, the throttle valve 50 of this embodiment is a flat type throttle valve, which is pressed between the intercooler 30 and the intake manifold 40 below the intercooler 30, and is connected to the intercooler 30 and the intake manifold 40 by fixing members such as bolts. The height of the flat throttle valve used in the present disclosure is lower than that of the conventional throttle valve, and the throttle valve 50 is directly connected to the intercooler 30 and the intake manifold 40, thereby eliminating the post-pressure tubeline between the intercooler 30 and the intake manifold 40, thus further reducing the height of the whole device and making the structure of the whole device more compact.

Figure 5:
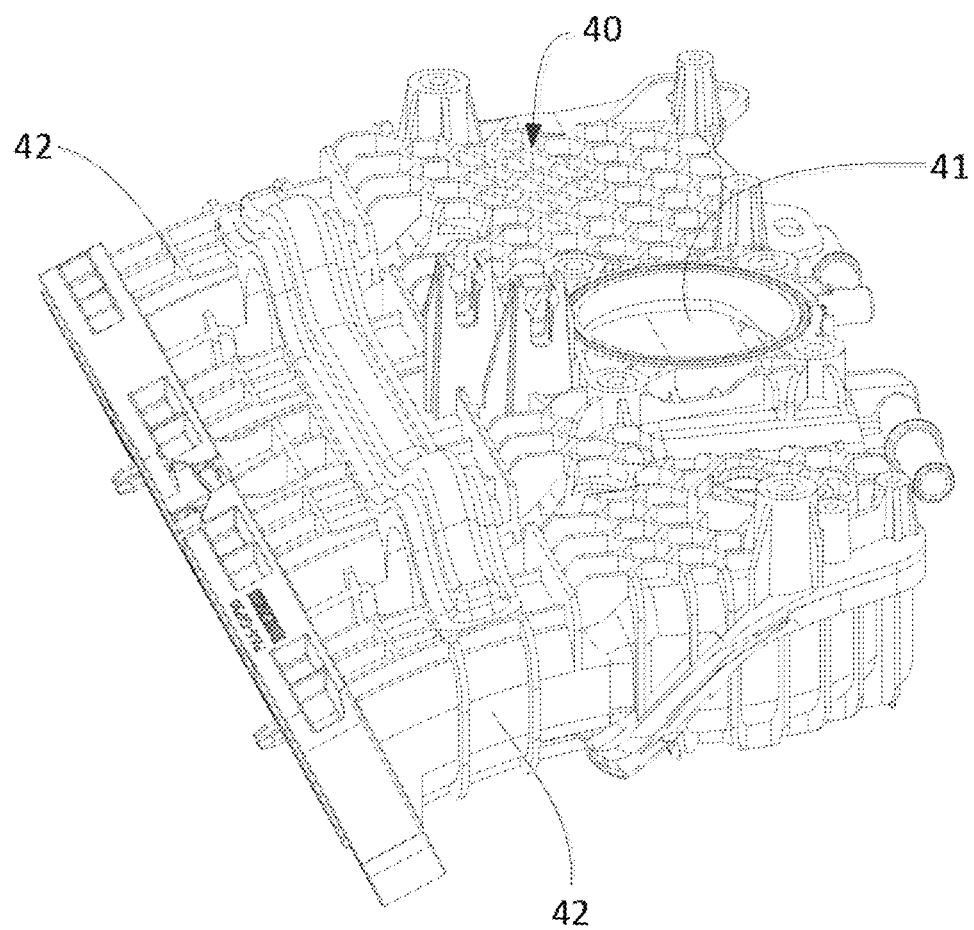
FIG. 5 is a schematic view of the intake manifold in FIG. 1 from a first angle.
Figure 6:
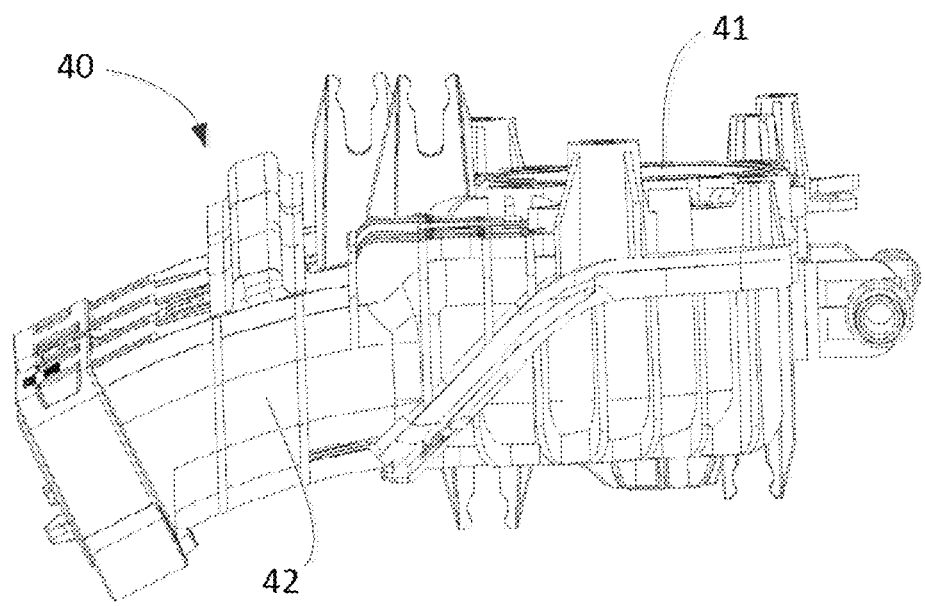
FIG. 6 is a schematic view of the intake manifold in FIG. 1 from a second angle.

Referring to FIGS. 5 and 6, the intake manifold 40 of this embodiment is located above the cylinder head 60 of the engine and is connected to an intake port of the cylinder head 60 of the engine. The intake manifold 40 includes a pressure stabilizing chamber 41 close to the intercooler 30 and the throttle valve 50, and a plurality of intake passages 42 connected between the pressure stabilizing chamber 41 and the intake port of the cylinder. The gas entering the intake manifold 40 is stabilized by the pressure stabilizing chamber 41 and then enters the cylinder through the intake passage 42.

It should be noted that, in this embodiment, the height of the pressure stabilizing chamber 41 is higher than that of the intake passage 42, the bottom of the pressure stabilizing chamber 41 is a horizontal bottom surface, a body of the intake passage 42 has a linear structure, and the intake passage 42 of the intake manifold 40 is inclined upward with respect to the intake port of the cylinder at an angle of 22° to 28°, so that there is no low-lying part in the intake passage 42, and water vapor condensed by cooling in the intake passage 42 can flow to the cylinder along the inner wall surface of the intake passage 42, thereby avoiding accumulation in the intake manifold 40.

As can be seen from the above description, by arranging the intercooler 30 and the intake manifold 40 above the cylinder head 60, the present disclosure makes the height difference between the intercooler 30 and the intake manifold 40 reduce, so that the whole device is formed into a flat structure, reducing the space occupied by the whole device, and reducing the length of the connecting tube line between the elements, thereby making the structure of the whole device more compact, which is conducive to the improvement of supercharge response speed and cost reduction. In addition, by pressing the throttle valve 50 between the intercooler 30 and the intake manifold 40 and adopting a flat throttle valve, the compactness of the whole device can be further increased. Further, according to the present invention, the gas passage inlet 31a and the gas passage outlet 31b of the intercooler 30 and both ends of the intake passage 42 of the intake manifold 40 can form a height difference by arranging the intercooler 30 and the intake manifold 40 obliquely in a height direction, so that condensed water vapor in the intercooler 30 and the intake manifold 40 can flow from a high position to a low position, thereby preventing water vapor from accumulating and corroding related elements.

The technical features of the above-described embodiments may be arbitrarily combined, and all possible combinations of the technical features of the above-described embodiments have not been described in order to make the description concise. However, as long as there is no contradiction in the combinations of these technical features, they should be considered as falling within the scope of the description.

It should be noted that, the terms "comprise", "include" or any other variation thereof here are intended to encompass non-exclusive inclusion, which includes not only those elements listed, but may also include other elements that are not explicitly listed.

The above is only the detail description of the embodiments of the present disclosure, but the scope of protection of the present disclosure is not limited thereto, and any change or replacement, disposed in the technical scope disclosed by the present disclosure, that can be easily conceived by any person skilled in the art who is familiar with the technical filed should be covered within the scope of protection of the of the present disclosure. Therefore, the scope of protection of the present disclosure shall be subject to the scope of protection of the claims.

What is claimed is:

1. An air intake device comprising:
a supercharger connected to an exhaust port of a cylinder;
a connection tube;
an intercooler connected to the supercharger through the connection tube, and
an intake manifold connected to the intercooler and an air inlet of the cylinder,
wherein the intercooler is located above a cylinder head of an engine;
wherein the intake manifold is disposed above the cylinder head of the engine;
wherein the air intake device is of a flat structure;
wherein a gas passage in the intercooler is inclined downward relative to a horizontal direction, and a height of a gas passage inlet of the intercooler is higher than a height of a gas passage outlet;
wherein the supercharger is located on an upper left side of the cylinder head of the engine;
wherein an exhaust gas inlet pipe of the supercharger is connected to an exhaust gas inlet of the supercharger and extends upward from the exhaust gas inlet; and
wherein a height of the exhaust gas inlet pipe between the exhaust gas inlet and a turbine is greater than a height of the exhaust gas inlet.

2. The air intake device according to claim 1, wherein a height of an air outlet of the supercharger is lower than the height of the gas passage inlet of the intercooler.

3. The air intake device according to claim 1, wherein the gas passage of the intercooler is inclined downward relative to the horizontal direction at an angle ranging from 13.65° to 19.65°.

4. The air intake device according to claim 1, wherein an intake passage in the intake manifold is inclined downward relative to a horizontal direction, and a height of one end of the intake passage close to the intercooler is higher than a height of one end of the intake passage close to the cylinder.

5. The air intake device according to claim 4, wherein the intake passage in the intake manifold is inclined downward relative to the horizontal direction.

6. The air intake device according to claim 5, wherein the intake passage in the intake manifold is inclined downward relative to the horizontal direction at an angle ranging from 22° to 28°.

7. The air intake device according to claim 4, wherein the intake manifold further comprises a pressure stabilizing chamber having a height higher than a height of the intake passage.

8. The air intake device according to claim 1, further comprising a throttle valve directly fixed between the intercooler and the intake manifold.

9. The air intake device according to claim 8, wherein the throttle valve is of a flat structure.

10. The air intake device according to claim 1, wherein the connection tube has a V-shaped structure with an apex pointing upwards.

* * * * *